UNITED STATES PATENT OFFICE.

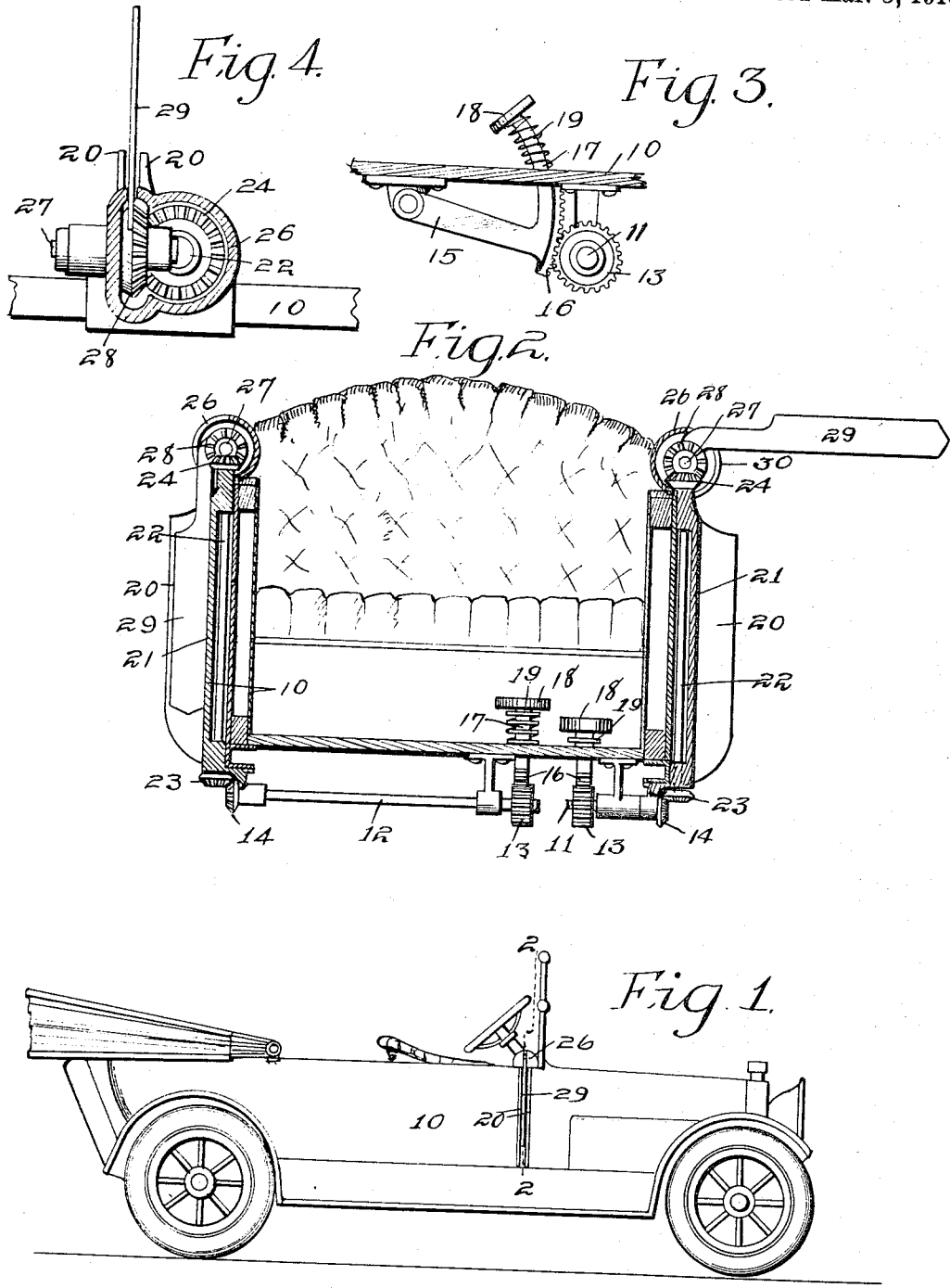
C. L. DEBOLT.
AUTOMOBILE SIGNAL.
APPLICATION FILED MAY 9, 1917.
1,258,200.
Patented Mar. 5, 1918.

CHARLES L. DEBOLT, OF DES MOINES, IOWA.

AUTOMOBILE-SIGNAL.

1,258,200.

Specification of Letters Patent. Patented Mar. 5, 1918.

Application filed May 9, 1917. Serial No. 167,616.

*To all whom it may concern:*

Be it known that I, CHARLES L. DEBOLT, a citizen of the United States, and resident of Des Moines, in the count of Polk and State of Iowa, have invented a certain new and useful Automobile-Signal, of which the following is a specification.

The object of my invention is to provide an automobile signal, of simple, durable and inexpensive construction.

A further object is to provide such a signal having an arm pivotally mounted and adapted to normally hang in depending position adjacent to the side of the automobile, in connection with suitable mechanism preferably adapted to be operated by the foot, whereby said arm may be raised to horizontal position extending away from the automobile, the parts being so arranged that when the actuated mechanism is released, the arm will automatically drop to lowered position.

A further object is to provide a suitable casing for said arm in its lowered position.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of a motor vehicle equipped with a signal device embodying my invention.

Fig. 2 shows a transverse, vertical, sectional view of the same, taken on the line 2—2 of Fig. 1.

Fig. 3 shows a detail, sectional view of the foot operated pedal and part of the actuated mechanism, and Fig. 4 shows a detail, sectional view of other parts of the actuating mechanism.

In the accompanying drawings I have used the reference numeral 10 to indicate generally the body of a motor vehicle. I preferably locate my signal arm on the side of the body near the front end thereof, and I preferably use two arms, one on each side of the machine.

Where two arms are used I mount in suitable bearings beneath the floor of the machine body 10 two shafts 11 and 12 preferably arranged in alinement with each other, as shown in Fig. 2. The inner ends of the shafts 11 and 12 are located approximately below the place occupied by the feet.

The shaft 11 extends laterally to one side of the automobile body, and the shaft 12 extends laterally to the opposite side of the automobile body. It is obvious that the shafts 11 and 12 are mounted transversely of the machine.

On the inner end of each shaft 11 and 12 is a pinion 13, and on the outer end of said shaft is a beveled gear 14. Pivoted below the body 10 just rearwardly preferably from the pinion 13, is a lever 15 extending forwardly in the machine.

At the forward end of each lever 15 is a curved rack bar 16 in mesh with one of the pinions 13. Extending upwardly through the floor of the body 10 from the upper end of each rack 16 is an arm 17 on the upper end of which is a foot pedal 18.

Mounted on each arm 17 near the floor of the machine and the foot pedal 18 is a coil spring 19.

For each signal arm there are secured to the outer side of the body of the automobile on the side thereof, two upright strips 20. On each strip 20 on each side of the machine is an upright cylindrical member 21 in which is rotatably mounted an upright shaft 22. On the lower end of the shaft 22 is a beveled gear 23 in mesh with one of the beveled gears 14. At the upper end of the shaft 22 is a beveled gear 24. At the upper end of each cylindrical member 21 is a gear casing in which is mounted a horizontal shaft 27. On each shaft 27 is a beveled gear 28 in mesh with one of the beveled gears 24.

Fixed with relation to the beveled gear 28 is a signal arm 29, extending outwardly through a slot 30 in the gear casing 26, and adapted normally to hang downwardly between the adjacent strips 20.

In the practical use of my improved signal device, the arms 29 normally hang down between the strips 20.

When the driver desires to give the signal that he is about to stop, or that he is about to turn to the right or to slow down he puts his foot on the right-hand foot pedal 18 forcing the same downwardly against the tension of the spring 19 and by the action of the rack bar 16 imparting rotation to the beveled gear 15 and the shaft 11. Rotation is thereby imparted to the shaft 22 and the shaft 27, whereupon the arm 29 is raised from its downwardly hanging position to its laterally extending horizontal position shown at the right hand side of Fig. 2.

When the pressure on the foot pedal is released, the arm 29 will drop by gravity to its lower position.

When the operator desires to work the left-hand signal arm 29 he places his foot on the left-hand foot pedal 18 and the operation is the same as that already described.

The advantage of a device of this kind is obvious from the foregoing description. The user can readily and easily signal anyone following him or any one in front of the automobile, and at the same time may have his hands free for manipulating the gearing wheel or other parts of the operative mechanism of the machine.

I appreciate the fact that numerous changes might be made in the construction and arrangement of the parts of my improved signal device without departing from its essential features and purposes, and it is my intention to cover by this application any such changes which may be included within the scope of my claims.

I claim as my invention:

1. An automobile signal comprising a horizontal shaft designed to be mounted on the body of a motor vehicle, a lever pivotally supported at one end, a curved rack bar on said lever, a pinion on said shaft in mesh with said curved rack bar, a foot pedal on said rack bar, a spring for yieldingly holding said rack bar at one limit of its movement, a signal arm pivotally mounted outside the body of the motor vehicle, and a gearing device for operatively connecting said arm with said shaft.

2. An automobile signal comprising a horizontal shaft designed to be mounted on the body of a motor vehicle, a lever pivotally supported at one end, a curved rack bar on said lever, a pinion on said shaft in mesh with said curved rack bar, a foot pedal on said rack bar, a spring for yieldingly holding said rack bar at one limit of its movement, a signal arm pivotally mounted outside the body of the motor vehicle, and a gearing device for operatively connecting said arm with said shaft, and strips forming a receptacle for said arm when in its lower position.

Des Moines, Iowa, July 24, 1916.

CHARLES L. DEBOLT.